INVENTOR:
Eduard Mezger
BY: Michael S. Striker
ATTORNEY

Jan. 2, 1962 E. MEZGER 3,015,514

POSITIONING ARRANGEMENT FOR A GRIPPING DEVICE FOR MOULDING BOXES OR THE LIKE

Filed Aug. 22, 1957 3 Sheets-Sheet 2

INVENTOR:
Eduard Mezger
BY: Michael S. Striker
ATTORNEY

FIG. 4
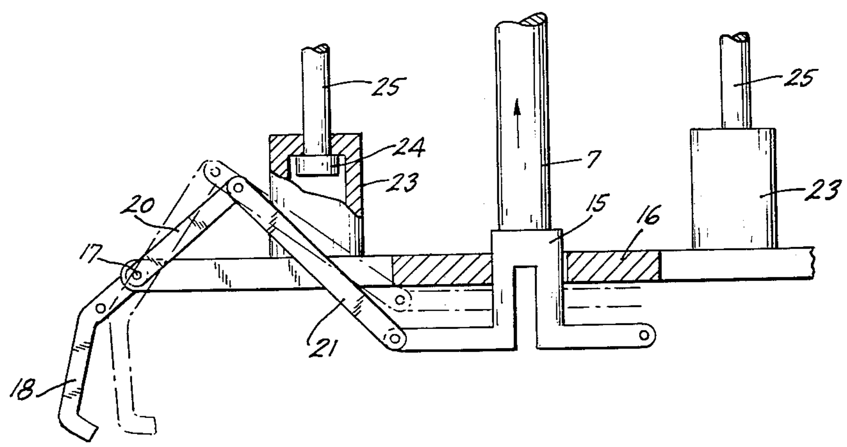
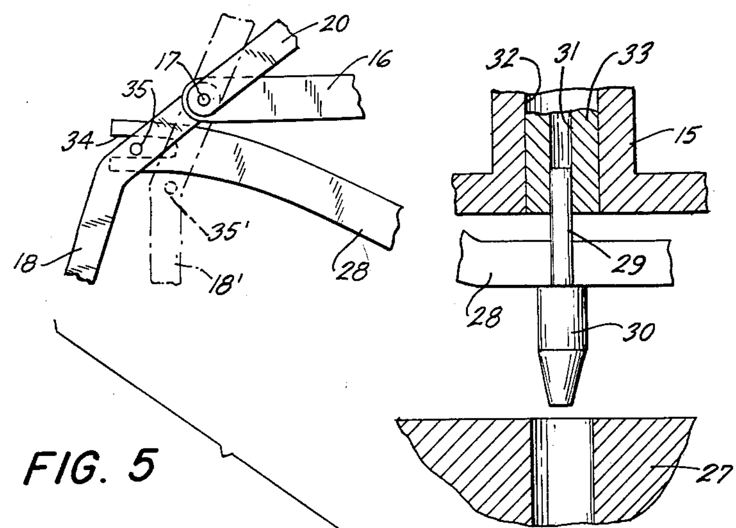
FIG. 5
INVENTOR.
Eduard Mezger
BY
Michael S. Striker
Attorney

United States Patent Office 3,015,514

Patented Jan. 2, 1962

3,015,514

POSITIONING ARRANGEMENT FOR A GRIPPING DEVICE FOR MOULDING BOXES OR THE LIKE

Eduard Mezger, Muhlegasse 198, Kallnach, Switzerland

Filed Aug. 22, 1957, Ser. No. 679,656
Claims priority, application Switzerland Aug. 24, 1956
7 Claims. (Cl. 294—86)

Automatic gripping devices for raising an object from one place and setting it down in another are known in various constructional forms. Apparatus of this type are used, for example, in moulding operations to lift the empty moulding boxes from a delivery appliance, for example from a roller table or from a caterpillar band, by means of which the moulding boxes are conveyed to the moulding machine, and to set them down upon a moulding plate mounted on the table of the moulding machine. The empty moulding boxes are held on the delivery appliance, by means of stops or the like, substantially in the required position, but this does not suffice to allow the moulding boxes to be seized by the gripping device with such accuracy that they may be set down upon the moulding plate with the necessary precision.

It is among the objects of the invention to overcome this disadvantage. According to the invention centering means are provided for an automatic gripping device for lifting and setting down moulding boxes in which each of plurality of grab levers of the gripping device is provided, through linkage, with fixedly mounted means adapted for engagement in apertures in the moulding box during the lifting and withdrawal therefrom on the setting down of the boxes.

According to the invention in centering means for an automatic gripping device for moulding boxes the four grab levers of the gripping device are each provided in their central portion with a fixedly mounted, laterally projecting axial pin, the pins of each pair of grab levers lying opposite each other being disposed in bifurcations provided at the ends of a traverse, the traverses being fixedly connected to a rod or bar mounted at their centre and perpendicular to them, which rod or bar is adapted to be displaced in height relative to the gripping device, but is secured against transverse and longitudinal displacement, there being fixedly mounted to each of the ends of this rod or bar which project laterally over the traverses a downwardly directed centering pin, which centering pins fit into the pin apertures of the moulding boxes to be seized by the gripping device so that when the gripping device is closed, the traverses are moved in a downward direction in relation to the axes of rotation of the grab levers, and thus the centering pins mounted on the rod or bar which is fixedly connected to these traverses are inserted in the pin apertures of the molding boxes to be seized by the gripping device, whilst when the gripping device opens, after the molding boxes are set down, the afore mentioned traverses and the rod or bar fixedly connected with them are moved upwardly in relation to the axes of rotation of the grab levers, and thus the centering pins mounted on the rod or bar are withdrawn from the pin apertures in the moulding box.

One method of carrying the invention into effect is diagrammatically illustrated by way of example in the accompanying drawings in which:

FIGURE 3 shows part of a section along the line III—III of FIGURE 1.

FIG. 4 is a partial, partially sectional front view of the gripping mechanism of the apparatus of the present invention as shown in FIG. 2, drawn to an enlarged scale and omitting the centering mechanism.

FIG. 5 is a partial partially sectional front view of the centering mechanism and showing only those elements of the gripping mechanism which cooperate with the centering mechanism.

Figure 1:
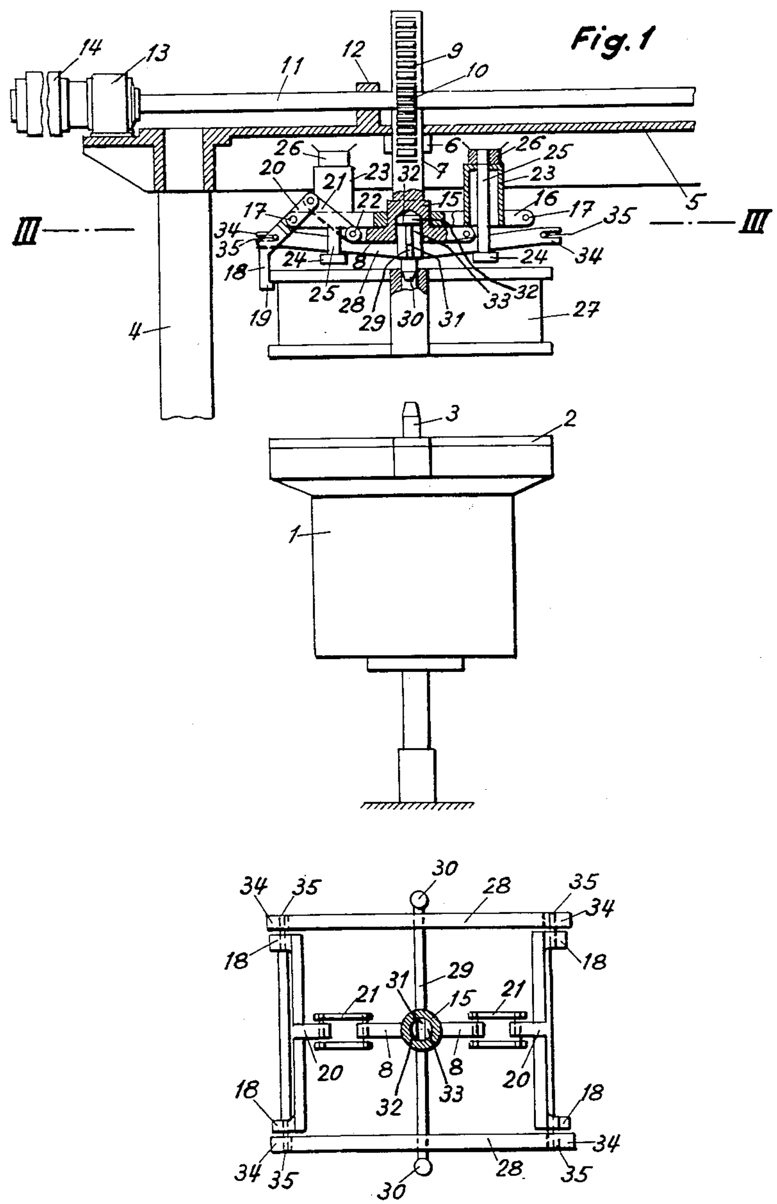
FIGURE 1 shows, partially in section, a part of apparatus for lifting the empty moulding boxes from a delivery appliance, and for setting them down upon the table of a moulding machine the automatic gripping device being provided with centering means according to the invention. The gripping device is shown closed, carrying a moulding box.

In the drawings 1 designates the table of a moulding machine not illustrated further, on which is mounted a moulding plate 2, which is provided with centering pins 3. Near the moulding machine is mounted a vertical rotary column 4, at the upper end of which a jib 5 is fixedly mounted. In the jib 5 is provided a vertical guide 6, in which is displaceably guided a lifting rod 7. Rod 7 has at its lower end a cylindrical lug 15 which carries two bearer arms 8 which project outwardly in opposite directions and form a bearer member with lug 15. The lifting rod 7 is provided with an indented bar or rack 9, in which a cog wheel 10 engages, the cog wheel being mounted on a shaft 11 mounted in bearings 12 on the jib 5 and driven, through a reduction gear 13, by a reversibly electric motor 14. Above the bearer members 8 a horizontal bearer plate 16 is displaceably guided on portion 15. In each of two edge portions of this bearer plate 16, which edge portions lie opposite each other, a pin 17 is rotatably mounted, on which are mounted two grab levers 18, the ends of which are provided with grab claws 19. Between the two grab levers 18, a lever 20 is fixedly mounted on each pin 17, to the end of which lever one end of a connecting bar 21 is articulated, the other end of which is mounted on a pin 22 in the bearer member 8. On the bearer plate 16, four vertical cylinders 24 are fixedly mounted, in each of which a piston 24 is adapted to be displaced. The pistons 24 are mounted on piston rods 25, which project upwardly from the cylinders 23, and which are adjustably held in bearings 26 provided on the jib 5.

Figure 2:
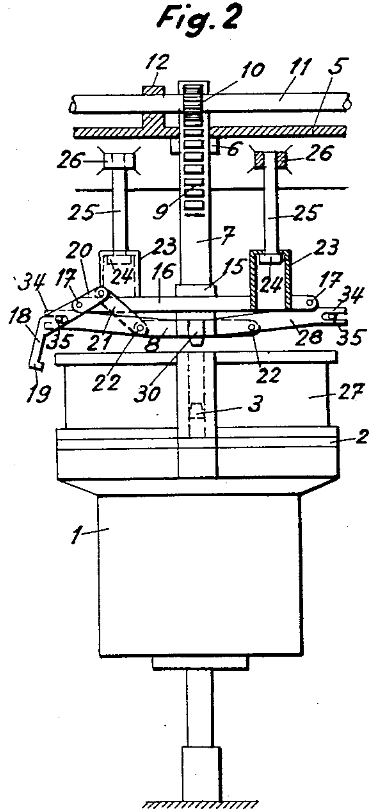
FIGURE 2 shows the gripping device according to FIGURE 1, in the open position after the moulding box has been set down on the table of the moulding machine.

This gripping device operates as follows: If the lifting rod 7, with the bearer members 8 projecting in opposite direction from the lug 15 of the lifting rod 7, is lowered by means of the gear and rack mechanism 9, 10 shown in FIG. 1, then the bearer plate 16, under the influence of its own weight, follows the bearer members 8, until the pistons 24, fixedly connected by rods 25 to the bosses 26 of the jibs, come into contact with the top of the cylinders 23 and prevent a further sinking of the bearer plate 16. When the lifting rod 7, with the bearer members 8, is moved still further in downward direction the bearer members 8 become separated from the bearer plate 16 and thus the levers 20 connected by guide rods 21 to members 8 and the grab levers or gripping means 18 lying opposite each other are swung about pivot pins 17 to which levers 18 and 20 are respectively fixedly connected and which are mounted on plate 16 so that levers 18 move apart as illustrated in FIGURE 2. The gripping device opened in this manner may be lowered upon a moulding box 27 conveyed upon a delivery appliance not illustrated, for example, a roller table. If now the lifting rod 7 with the bearer member 8 is again raised, then, at first, the bearing plate 16 remains suspended, in its lowest position, on the pistons 24 and the piston rods 25 and the bearer members approach this bearer plate 16. At the same time, through the guide bar 21, the lever 20 and the pins 17, the grab levers 18 lying opposite each other are swung together, as shown in dotted lines in FIG.

4, that is the gripping device closes and the moulding box 27 which is to be lifted is seized by the claws 19 of the grab levers 18. The lifting rod 7 and the elements operatively connected thereto constitute therefore operating means for moving the grab levers or gripping means 18 between an inoperative and a gripping position. When the lifting rod 7 with the bearer member 8 is further raised, the moulding box 27 is lifted with it, and by the rotation of the rotary column 4 in the jib 5, is brought over the table 1 of the moulding machine, and there set down.

Two transverse links 28, perpendicular to the pins 17, are provided, one on each side of the bearer plate 16, which transverse links are fixedly connected to a flat rod or bar 29 disposed edgewise and passing centrally between and parallel to the pins 17. At each of the ends of the bar 29, where they project over the transverse links 28, a downwardly directed tapered centering pin 30 is fixedly mounted, which centering pins 30 are adapted to fit into pin apertures in the moulding box 27. The bar 29, which passes under the bearer member 8, is adapted to be displaced vertically in a slit 31 in a guide pin 33 inserted in a boring 32 in the guide lug 15, but is held so that it cannot be displaced longitudinally nor transversely, so that its centering pins 30 are always in the correct position. Both ends of both transverse links 28 are bifurcated and in each of these bifurcations 34 an axial pin 35 is held, which is mounted on the central portion of the grab lever 18 associated with the appropriate bifurcation 34 and projects laterally from the lever.

If the gripping device in the open position is lowered over a moulding box 27 upon the delivery appliance, and then closed, in the manner described, during the first phase of the lifting of the lifting rod 7 with the bearer member 8, that is when the grab levers 18 lying opposite each other are swung towards each other, then the transverse links 28, suspended from the axial pins 35 of the grab levers 18, are lowered in relation to the pins 17 or to the bearer member 8, whereupon these axial pins 35 in the bifurcations 34 of the transverse links 28 are inwardly displaced, and the rod 29 in the slit 31 of the guide pin 33 is downwardly displaced. This ensures that the centering pins 30 on the rod 29 are inserted in the pin apertures of the moulding box 27, and hold the moulding box 27 centred. If, when the moulding box 27 is set down on the moulding plate 2 on the table 1 of the moulding machine, the gripping device is again opened, then the swinging apart of the grab levers 18 conversely effects a lifting, relative to the bearer member 8, of the traverses suspended on their axial pins 35, and thus a withdrawal of the centering pins 30 on the rod 29 from the pin apertures of the moulding box 27. This does not happen, however, until the moulding box 27 is already set down on the moulding plate 2, that is when the centering pins 3 of the moulding plate 2 have already entered the pin apertures of the moulding box 27 and hold the moulding box 27 centred. Since the transverse links 28 are rigid, the levers 18 cannot move to the gripping position shown in FIG. 1 before the centering pins 30 have moved into the corresponding apertures in the box 27. If pins 30 engage the top surface of the box, the levers 18 are held in a higher opened position. Consequently the box can only be gripped if it is in exactly centered position, namely, when a line passing through the pins 30 is located in a plane of symmetry of the box. Furthermore, since the apertures are symmetrically arranged to a transverse plane of symmetry of the box, the box must be centered with respect to the two hook-shaped ends 19 of the levers 18 located on the same side of plate 16.

When the grab levers or gripping arms 18 turn about the pivot pins 17 from their position shown in full lines in FIGS. 4 and 5 to their gripping position, as indicated in dash-dotted lines in these figures, the pins 35 will move along an arc, having a center at the axis of the respective pivot pin 17, inwardly and downwardly from the position shown in full lines in FIG. 6 to the position 35' shown in dotted lines. While the slots in the bifurcated ends 34 of the transverse links 28 will permit this inward movement of pins 35, the simultaneously occurring downward movement of the pins is possible only when the corresponding transverse link will move downward at the same time, and this will be possible only when the box to be gripped is centered with respect to the gripping mechanism and the centering mechanism, that is when the pins 35 fixedly connected to the transverse links are aligned with the openings formed in the box so that the pins 30 may penetrate into these openings. If, on the other hand, the box is not properly aligned with the gripping mechanism, the free ends of the pins 30 will abut against the top surface of the box and makes thus lowering of the transverse links and movement of the levers from the inoperative to the gripping position possible.

The elements 29, 30 constitute therefore positioning means adapted to engage and to determine the position of an object to be gripped by the gripping device of the present invention, and the transverse links 28 with the bifurcated end 34 and the pins 35 therein constitute linkage means connecting the gripping means with said positioning means.

I claim:

1. Positioning arrangement for a gripping device, comprising, in combination, gripping means movable between an inoperative position, and a gripping position for gripping an object; operating means for operating said gripping means to move between said positions; positioning means movable between a blocking position and an operative position and adapted to engage an object held by said gripping means to determine the position of said object; and rigid linkage means connecting said gripping means with said positioning means for moving said positioning means to and from said operative position while said gripping means move to and from said gripping position so that said positioning means is in said operative position while said gripping means is in said gripping position, said linkage means blocking movement of said gripping means to said gripping position if said positioning means is held by the object in said blocking position.

2. Positioning arrangement for a gripping device, comprising, in combination, gripping means movable between an inoperative position, and a gripping position for gripping an object; operating means for operating said gripping means to move between said positions; positioning means including at least two centering members movable between an operative position for engaging corresponding apertures in an object held by said gripping means to determine the position of said object and a blocking position engaging other parts of the object; and rigid linkage means connecting said gripping means with said centering members of said positioning means for moving the same to and from said operative position while said gripping means move to and from said gripping position so that said centering members are in said operative position while said gripping means is in said gripping position, said linkage means blocking movement of said gripping means to said gripping position if said centering members are held in said blocking position by the object.

3. Positioning arrangement for a gripping device, comprising, in combination, gripping lever means turnable between an inoperative position, and a gripping position for gripping an object; operating means for operating said gripping lever means to move between said positions; positioning means movable between an operative position for engaging an object held by said gripping lever means to determine the position of said object; a blocking and rigid linkage means including a pin and slot connection connecting said gripping lever means with said positioning means for moving said positioning means to and from said operative position while said gripping lever means move to and from said gripping position so that said positioning means is in said operative position while said gripping lever means is in said gripping position, said linkage means blocking movement of said gripping lever means to said gripping position if said positioning means is held by the object in said blocking position.

4. Positioning arrangement for a gripping device, comprising, in combination, gripping lever means turnable between an inoperative position, and a gripping position for gripping an object; operating means for operating said gripping lever means to move between said positions; positioning means including at least two centering members movable between an operative position for engaging corresponding apertures in an object held by said gripping lever means to determine the position of said object and a blocking position engaging other parts of the object; and rigid linkage means including a pin and slot connection connecting said gripping lever means with said centering members of said positioning means for moving said centering members to and from said operative position while said gripping lever means move to and from said gripping position so that said centering members are in said operative position while said gripping lever means is in said gripping position, said linkage means blocking movement of said gripping lever means to said gripping position if said centering members are held in said blocking position by the object.

5. Positioning arrangement for an object held by a gripping device, comprising, in combination, a movable support movable to and from an operative position; two pairs of gripping lever means mounted on said support for movement to and from a gripping position for gripping an object; operating means for operating said gripping lever means during movement of said support to and from said operative position; positioning means including a bar having at each end thereof a positioning pin adapted to engage a corresponding aperture in an object held by said gripping lever means to determine the position of said object, said bar being slidably guided in said support for movement in the direction of movement of the same to and from an operative position in which said pins engage said apertures; and a pair of rigid links interconnected by said bar and respectively interconnecting the gripping lever means of each pair, each link being pivotally connected to the associated gripping lever means, for moving said bar and positioning pins to and from said operative position of the same while said gripping lever means move to and from said gripping position so that said positioning means is in said operative position while said gripping lever means are in said gripping position, said links blocking movement of said gripping lever means to said gripping position when said positioning means is blocked from movement to said operative position by said pins engaging the object outside of the apertures therein.

6. Positioning arrangement for an object held by a gripping device, comprising, in combination, a movable support movable to and from an operative position; two pairs of gripping lever means mounted on said support for movement to and from a gripping position for gripping an object; operating means for operating said gripping lever means during movement of said support to and from said operative position; positioning means including a bar having at each end thereof a positioning pin adapted to engage a corresponding aperture in an object held by said gripping lever means to determine the position of said object, said bar being slidably guided in said support for movement in the direction of movement of the same to and from an operative position in which said pins engage said apertures; and a pair of rigid links interconnected by said bar and respectively interconnecting the gripping lever means of each pair, each link having at the ends thereof a slot, and each of said gripping lever means having a pin projecting into a slot of an associated link so that said bar and positioning pins are moved to and from said operative position of the same while said gripping lever means move to and from said gripping position, and are in said operative position while said gripping lever means are in said gripping position, said links blocking movement of said gripping lever means to said gripping position when said positioning means is blocked from movement to said operative position by said pins engaging the object outside of the apertures therein.

7. An apparatus as set forth in claim 6 and wherein said support has a portion formed with a slot extending in the direction of said bar and receiving the same for sliding movement, and wherein said bar has a rectangular cross-section whose narrower extension matches the width of said slot in said support.

References Cited in the file of this patent

UNITED STATES PATENTS

| | | |
|---|---|---|
| 1,058,193 | Mulholland | Apr. 8, 1913 |
| 1,368,780 | Anderson | Feb. 15, 1921 |
| 1,389,794 | Thiele et al. | Sept. 6, 1921 |
| 1,717,006 | Cartwright | June 11, 1929 |
| 1,794,306 | Liberge | Feb. 24, 1931 |
| 2,390,293 | Colson | Dec. 4, 1945 |
| 2,607,621 | Pulvino | Aug. 19, 1952 |
| 2,665,937 | Reigh | Jan. 12, 1954 |
| 2,847,245 | Leslie | Aug. 12, 1958 |
| 2,857,193 | Heppenstall | Oct. 21, 1958 |

FOREIGN PATENTS

| | | |
|---|---|---|
| 618,709 | France | Dec. 20, 1926 |